United States Patent
Doering (10) Patent No.: US 7,765,058 B2
(45) Date of Patent: Jul. 27, 2010

(54) DRIVER INPUT ANALYSIS AND FEEDBACK SYSTEM

(75) Inventor: Jeff Doering, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 877 days.

(21) Appl. No.: 11/561,755

(22) Filed: Nov. 20, 2006

(65) Prior Publication Data

US 2008/0120175 A1      May 22, 2008

(51) Int. Cl.
*G06F 19/00* (2006.01)

(52) U.S. Cl. .............................. 701/123; 701/1; 701/22; 701/23; 701/29; 701/200; 340/425.5; 340/439; 340/540; 455/422.1; 455/423; 455/456.1; 702/22; 702/182; 702/183; 702/188

(58) Field of Classification Search .................. None
See application file for complete search history.

(56) References Cited

U.S. PATENT DOCUMENTS

| | | | |
|---|---|---|---|
| 5,220,968 A | 6/1993 | Weber | |
| 6,694,806 B2 | 2/2004 | Kumagai et al. | |
| 6,925,425 B2 * | 8/2005 | Remboski et al. | 702/188 |
| 2002/0055811 A1 * | 5/2002 | Obradovich | 701/23 |
| 2004/0030458 A1 * | 2/2004 | Entenmann | 701/1 |
| 2004/0093155 A1 * | 5/2004 | Simonds et al. | 701/200 |
| 2004/0093264 A1 * | 5/2004 | Shimizu | 705/13 |
| 2005/0131597 A1 * | 6/2005 | Raz et al. | 701/29 |
| 2005/0143876 A1 * | 6/2005 | Tanase | 701/22 |
| 2005/0278055 A1 | 12/2005 | Ferguson et al. | |
| 2006/0006990 A1 * | 1/2006 | Obradovich | 340/439 |
| 2006/0202808 A1 * | 9/2006 | Obradovich | 340/425.5 |
| 2006/0217993 A1 * | 9/2006 | Anderson | 705/1 |
| 2007/0001831 A1 * | 1/2007 | Raz et al. | 340/439 |
| 2007/0149184 A1 * | 6/2007 | Viegers et al. | 455/422.1 |

* cited by examiner

*Primary Examiner*—Khoi Tran
*Assistant Examiner*—Jonathan Sample
(74) *Attorney, Agent, or Firm*—Allan J. Lippa; Alleman Hall McCoy Russell & Tuttle LLP (57) ABSTRACT

A method of driver training to improve fuel economy performance of a vehicle, the method including, receiving selected vehicle and driver operating data indicative of driving conditions and operator inputs captured during previous vehicle operation, processing the received selected vehicle and driver operating data, and generating driving recommendations to improve fuel economy performance based on the processed vehicle and driver operating data.

20 Claims, 7 Drawing Sheets

100 # DRIVER INPUT ANALYSIS AND FEEDBACK SYSTEM

BACKGROUND AND SUMMARY

Although vehicles can be designed to provide consistent performance from one vehicle to another, there can be wide variation in driver performance from one driver to another. For example, certain driver habits can affect fuel economy performance of a vehicle. Under some conditions, driver habits can have a greater affect on fuel economy performance than various technical engine or transmission improvements.

Thus, in one example, a method of driver training to improve fuel economy performance of a vehicle may be provided. The method comprising: receiving selected vehicle and driver operating data indicative of driving conditions and operator inputs captured during previous vehicle operation; processing said received selected vehicle and driver operating data; and generating driving recommendations to improve fuel economy performance based on said processed vehicle and driver operating data.

Thus, a driver can obtain tailored driving recommendations, for example, aimed specifically at particular driving behavior that can be modified, eliminated, or added to improve fuel economy. Further, these driving recommendations may also be tailored to the particular driving conditions experienced by the driver.

In one particular example, respective window position data may be captured and processed in view of vehicle speed, and a recommendation may be generated, which include rolling up windows when the vehicle travels beyond a predetermined speed in order to improve fuel economy performance of a vehicle. Furthermore, in another example, a personalized driver history may be generated that provides updated fuel economy performance information based on a driver's actual driving performance. The driver history may be used to track fuel economy performance improvement based on learned driving habits. In this way, driver training may be provided to improve fuel economy performance of a vehicle.

DETAILED DESCRIPTION

Figure 1:
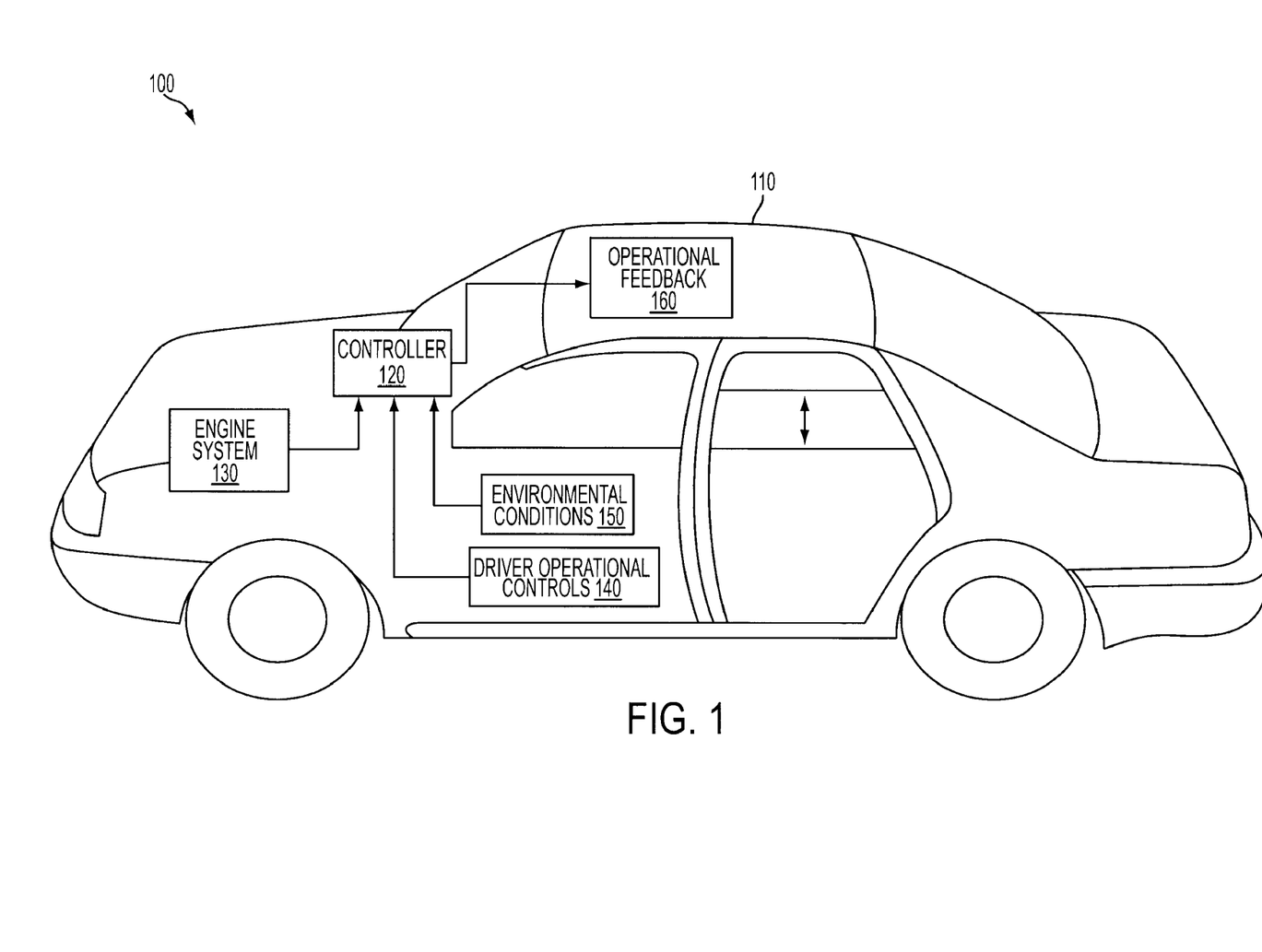
FIG. 1 is a high level schematic depiction of an exemplary driver input analysis and feedback system.

FIG. 1 shows a schematic diagram of an exemplary embodiment of a driver input analysis and feedback system 100. Driver input analysis and feedback system 100 may monitor driver input and vehicle operating conditions as well as provide operational feedback in the form of driver training/recommendations for vehicle operation. The driver training/recommendations may facilitate improved fuel economy performance by the vehicle, where the training/recommendations are personalized to the particular driving behavior and/or patterns of a particular operator of the vehicle.

Driver input analysis and feedback system 100 may be distributed throughout vehicle 110. More specifically, the system may include various monitoring devices disposed throughout vehicle 110 to monitor different control aspects of vehicle operation. In one example driver input analysis and feedback system 100 may monitor different aspects of engine system 130 including the transmission, driver operational controls 140, and environmental conditions 150. Driver input analysis and feedback system 100 further may include controller 120 which may be configured to receive and process signals from the monitoring devices. Controller 120 may process the various monitoring device signal inputs and output operational feedback 160 to provide driver training/recommendations to improve fuel economy performance of vehicle 110. In one example, operational feedback 160 may be generated in the form of a summary of driver training/recommendations relating to control of engine 130, driver operational controls 140, and environmental conditions 150.

Note that driver input analysis and feedback system 100 may be implemented in different vehicles including, cars, trucks, sport utility vehicles, buses, tractor-trailer trucks, and trains among others.

In some embodiments, the driver input analysis and feedback system may include multiple controllers. Further, different controllers may monitor and process input from different vehicle systems. For example, a controller may be designated to monitor, process, and store signals relating to aspects of engine and/or transmission operation, while a different controller may monitor, process, and store signals relating to aspects of environmental conditions (e.g. cabin climate controls). In some embodiments the driver input analysis and feedback system may include a hierarchy of controllers which may collect, store, and process input signal information. For example, one or more controllers may collect and store raw signal data and perform low level signal processing, such as signal enhancement, and various calculations. The processed signal data may be sent to one or more different controllers to perform additional processing and analysis as well as generate operational feedback. Alternatively, in some embodiments a single controller (or group of controllers) may operate the driver input analysis and feedback system in addition to controlling the engine, climate control systems, and other vehicle systems.

Figure 2:
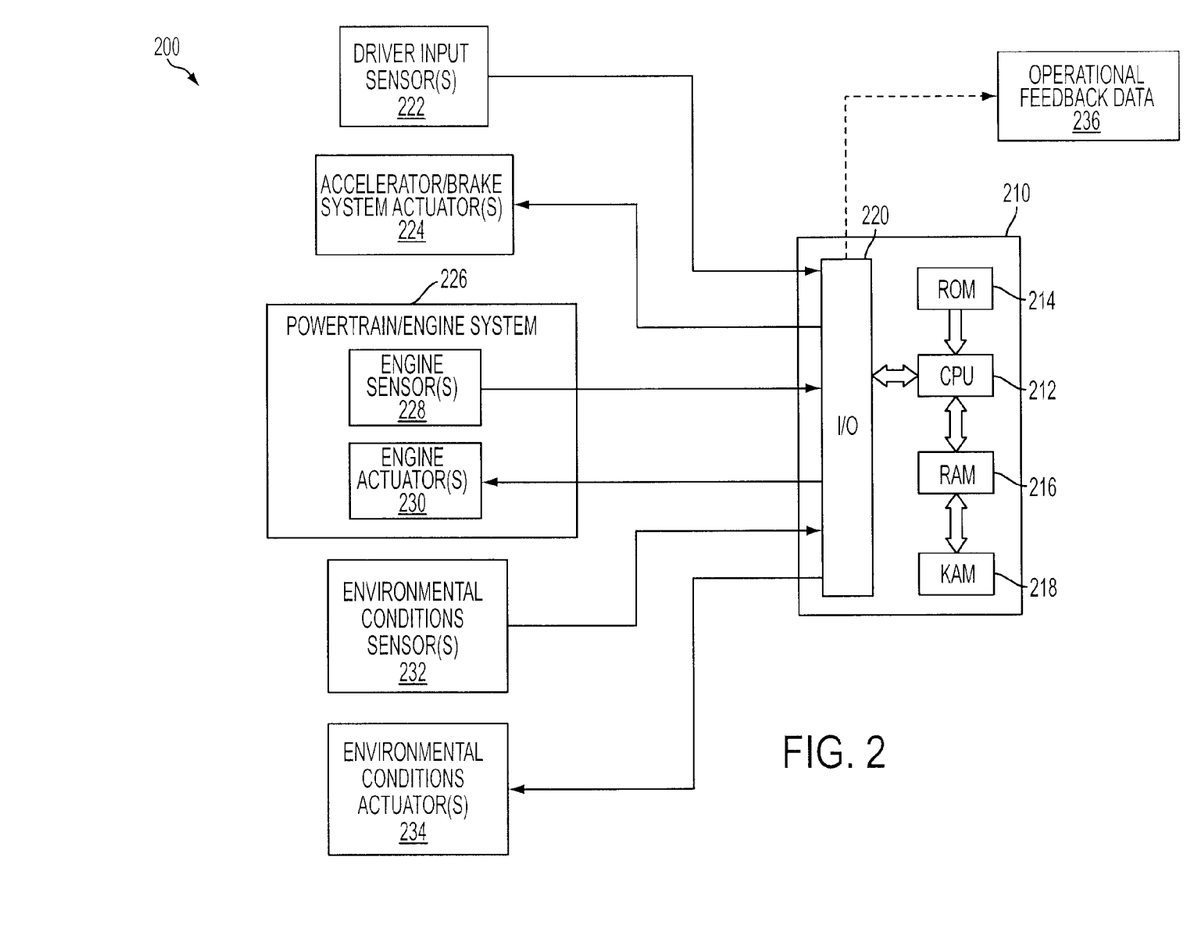
FIG. 2 is a schematic depiction of an exemplary driver input analysis and feedback system that is integrated with a vehicle control system.

FIG. 2 schematically depicts an exemplary embodiment of a driver input analysis and feedback system 200 that may be implemented as an element of a vehicle control system. Further, controller 210 may control the driver input analysis and feedback system as well as other systems relating to vehicle operation.

Controller 210 is schematically shown in FIG. 2 as a microcomputer, including microprocessor unit (CPU) 212, input/output ports 220, an electronic storage medium (ROM) 214, random access memory (RAM) 216, keep alive memory (KAM) 218, and a data bus. Controller 210 is shown receiving various signals from sensors coupled to powertrain/engine system 226, driver inputs 222, as well as sensors 232 to detect environmental conditions. Furthermore, controller 210 is shown sending various control signals to actuators in different vehicle systems including accelerator/brake system actuators 224, powertrain/engine system actuators 230, and environmental conditions actuators 234. In this exemplary configuration, vehicle control (e.g., engine and/or transmission control) may be administered by controller 210 via the different actuators based on signals received from the different sensors. It should be appreciated that operations performed by controller 210 to control the driver input analysis and feedback system may be some of numerous control operations performed by controller 210 during vehicle operation.

Controller 210 may receive signals from engine sensors 228 communicating operational conditions of powertrain/engine system 226. For example, engine sensors may detect temperatures of different engine components, for example, engine coolant temperature (ECT) from a temperature sensor coupled to a cooling sleeve disposed in powertrain./engine system 226; engine oil temperature may be measured by a engine oil viscosity and temperature sensor; transmission fluid temperature may be measured by a temperature sensor. Further controller 210 may receive signals from various other engine sensors including, mass air flow (MAF) which may be measured from a mass air flow sensor coupled to an intake manifold of powertrain/engine system 226; a profile ignition pickup signal (PIP) may be measured by a Hall effect sensor which may be coupled to a crankshaft of powertrain/engine system 226; a throttle position (TP) may be measured from a throttle position sensor; fuel flow rates may be measured in the fuel injection system by a fuel flow rate sensor; and an absolute Manifold Pressure Signal (MAP) further may be measured by a different sensor. Note that the above sensors are exemplary and other engine sensors may send signals to controller 210.

Furthermore, controller 210 may send signals based on sensor measurements to control different engine actuators during engine operation. For example, engine speed signal (RPM) may be generated by controller 210 from signal PIP and manifold pressure signal MAP from a manifold pressure sensor provides an indication of vacuum, or pressure, in the intake manifold. Controller 210 may operate intake and exhaust valves of the respective cylinders in powertrain/engine system 226 as well as control the amount of fuel delivered by fuel injectors so that the air/fuel mixture in the cylinders may be selected to be at stoichiometry, a value rich of stoichiometry or a value lean of stoichiometry. Moreover, in some embodiments various other engine actuators may be controlled by controller 210 during vehicle operation including, ignition systems, compression devices, and fuel vapor purging systems, among others.

Controller 210 may further control engine actuators 230 to operate powertrain/engine system 226 based on sensors that provide an indication of exhaust gas air/fuel ratio such as an exhaust gas oxygen (EGO) sensor, linear oxygen sensor, an UEGO, a two-state oxygen sensor, a HEGO, or an HC or CO sensor. Further, powertrain/engine system signals may be used during air/fuel control in order to estimate and validate various aspects of a desired engine control.

In some embodiments, controller 210 manages transmission system operation to improve engine performance and/or fuel economy in response to driver input. Powertrain/engine system 226 may include a transmission system that may be connected to the engine via a crankshaft. The crankshaft may be coupled to a torque converter which is also coupled to a transmission via a turbine shaft. The torque converter may include a bypass, or lock-up clutch. The lock-up clutch may be actuated electrically, hydraulically, or electro-hydraulically, for example. The transmission may comprise an electronically controlled transmission with a plurality of selectable discrete gear ratios which may be connected to controller 210. Alternatively, in some embodiments, the transmission system may be configured as a continuously variable transmission (CVT), or a manual transmission. It should be appreciated that in some embodiments the powertrain/engine system may include one or more electric motors that generate power in combination with an internal combustion engine as part of a hybrid powertrain/engine system. Alternatively, in some embodiments the powertrain/engine system may generate power only from an electric motor. Further, powertrain/engine system signals may be used to transmit power generated by the engine to the powertrain responsive to driver input. For example, various sensor signals may include vehicle speed, engine speed, transmission state (e.g. torque converter lockup, gear ratio, shift schedule, etc.), manifold pressure, mass air flow, input/exhaust valve position, cam position, power differential signals, among others.

Driver input analysis and feedback system 200 may included a plurality of driver input sensors 222 to send signals indicating driver intentions to controller 210. For example, a pedal position indication (PP) may be determined by a pedal position sensor that senses the angle of the pedals according to driver input. Driver steering input may be determined by a steering wheel position sensor. Additional driver inputs that may be controlled by controller 210 include the cruise control system, gear shifter, and emergency brake, among others. In one example, the driver may set a desired vehicle speed and activate the cruise control system via coordinated action of the throttle pedal and/or cruise control input devices. Then, the controller may adjust engine output (e.g., via throttle, spark timing, air-fuel ratio, etc.) and/or transmission states to maintain the desired vehicle speed. Further, in some embodiments, a driver may change vehicle operating modes or activate/deactivate control systems via inputs which may be connected to the controller. Some exemplary operating modes may include sport mode, fuel economy mode, overdrive, all wheel drive and dynamic stability control.

Furthermore, controller 210 may control accelerator/brake system actuators 224 responsive to driver input. For example, controller 210 may send signals to brake actuators to increase braking pressure according to indication of brake pedal position. Additionally, controller 210 may adjust braking patterns and wheel specific brake pressure based on activation of dynamic stability control and/or anti-lock braking (ABS). Note that indicated position of the accelerator pedal may cause controller 210 to adjust engine actuators 230 to create engine output responsive to driver demands. Further, controller 210 may adjust the various actuators based on frequency and/or degree of detected driver input. For example, controller 210 may adjust engine actuators 230 based on the frequency and/or degree of brake and accelerator pedal actuation.

In one example, the driver input analysis and feedback system may include environmental conditions sensors to detect the state of various components inside the vehicle as well as to detect ambient conditions inside and outside of the vehicle in order to provide accurate control feedback to the driver for improved fuel economy performance. For example, environmental conditions sensors 232 may include various temperature sensors such as a cabin temperature sensor to measure ambient cabin temperature of the vehicle, and an external temperature sensor to measure the ambient temperature outside of the vehicle. Environmental conditions sensors 232 may also detect climate control settings and respective window positions in order to provide driver input feedback that corresponds with the detected temperatures. Further, environmental conditions sensors 232 may include humidity sensors (e.g. internal and external to the vehicle) to measure humidity inside the cabin and outside of the vehicle.

Driver input analysis and feedback system 200 may include environmental conditions actuators 234 which may be controlled by controller 210. In one example, a climate control system may include actuators connected to controller 210 which may control the climate of the vehicle cabin by blowing in heated air from the engine compartment into the vehicle cabin to increase cabin temperature. Furthermore, controller 210 may cool vehicle cabin temperatures by activating the air-conditioning system to produce cool air. Alternatively (or additionally), in some embodiments climate control of the vehicle cabin may be controlled by the driver. In another example, environmental conditions actuators 234 may include actuators for changing the respective position of the windows. Window position may be controlled by controller 210 according to driver input analysis and/or feedback.

As described above, FIG. 2 shows one exemplary driver input analysis and feedback system as part of a vehicle control system configuration, and it should be appreciated that various other system configurations may be implemented that involve more or less automated control via controller 210. Further, in some embodiments some sensors and/or actuators may be omitted from the vehicle control system.

Example driver input analysis and feedback system operations are described herein. In particular, control routines are described below which may be used with various engine configurations, such as those described in FIGS. 1 and 2. As will be appreciated by one of ordinary skill in the art, the specific routines described below in the flowcharts may represent one or more of any number of processing strategies such as event-driven, interrupt-driven, multi-tasking, multi-threading, and the like. As such, various acts or functions illustrated may be performed in the sequence illustrated, in parallel, or in some cases omitted. Likewise, the order of processing is not necessarily required to achieve the features and advantages of the example embodiments of the invention described herein, but is provided for ease of illustration and description. Although not explicitly illustrated, one of ordinary skill in the art will recognize that one or more of the illustrated acts or functions may be repeatedly performed depending on the particular strategy being used. Further, these figures may graphically represent code to be programmed into the computer readable storage medium in a controller.

Figure 3:
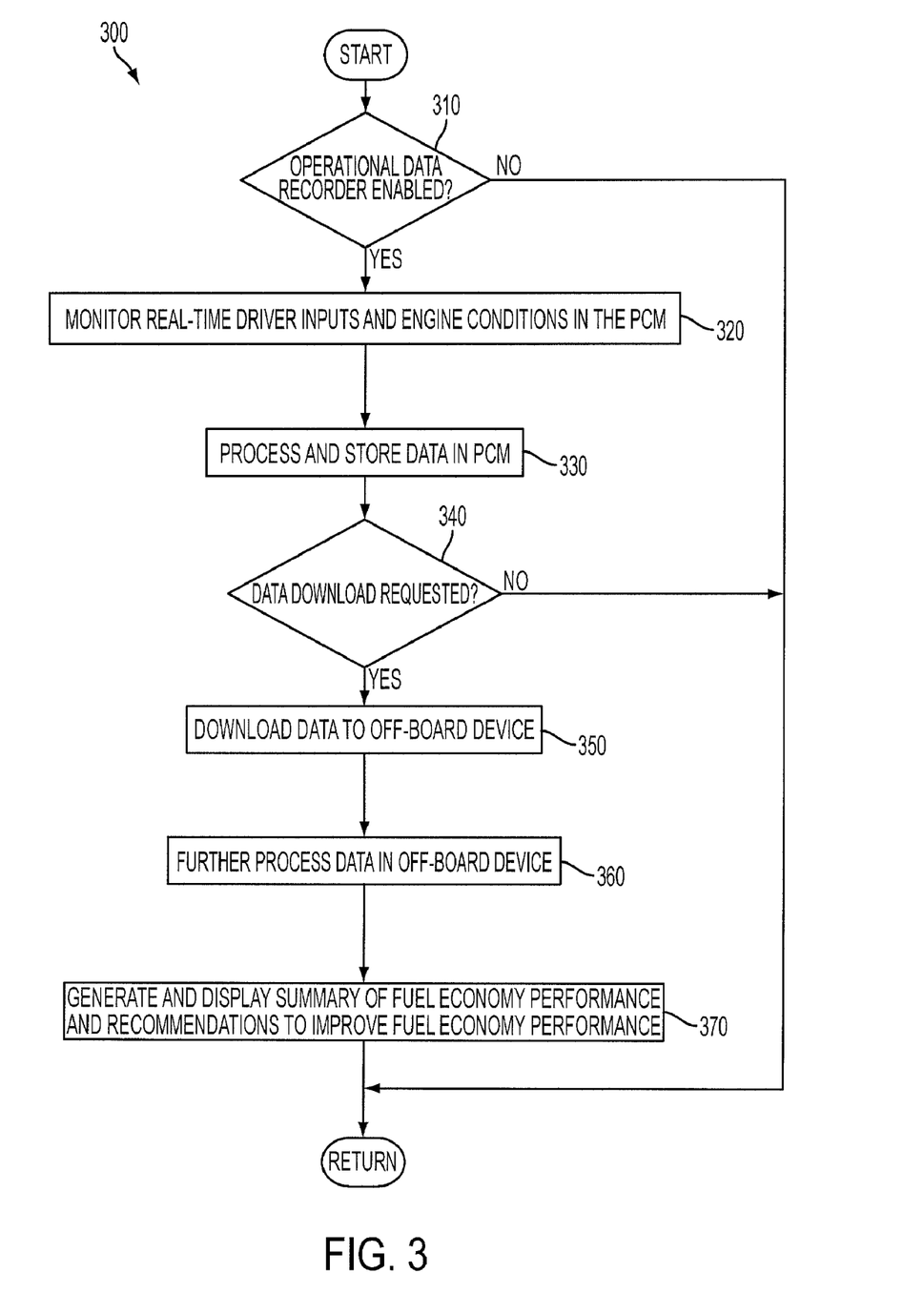
FIG. 3 is a flow diagram of an exemplary routine for analyzing driver input and providing corresponding feedback to improve fuel economy performance in a vehicle.

Referring now to FIG. 3, a high-level routine 300 is described for analyzing driver input and providing corresponding feedback to improve fuel economy performance in the vehicle.

First, at 310, the routine determines if an operational data recorder is enabled. As described above in one example, sensors may generate and send data corresponding to operating conditions to a controller to be analyzed and stored in memory. In some embodiments the operational data recorder may be embedded in the controller's memory. Alternatively, in some embodiments the operational data recorder may be a discrete data storage device separate from the controller.

Continuing with FIG. 3, if routine 300 determines that the operational data recorder is enabled the routine moves to 320. Otherwise, if routine 300 determines that the operational data recorder is not enabled (i.e. disabled) the routine ends. The operational data recorder may be disabled for various reasons, such as sensor degradation, controller degradation, and/or the vehicle is not operating, for example.

Next, at 320, routine 300 monitors real-time driver inputs and engine/transmission conditions in the powertrain control module (PCM). In one example a plurality of sensors may detect parameters relating to vehicle and engine speed, vehicle acceleration, engine temperature, and engine air-fuel ratio, among others. Further, in some embodiments, the PCM may be configured to adjust monitoring behavior to maintain measurement precision. In particular the PCM may adjust sampling rates of the sensors based on detected driving conditions. Additionally, the PCM can be configured to monitor particular operating parameters based on specific events or conditions. For example, the controller can be configured to monitor a particular set of engine conditions during engine shutdown and/or shut-off. Further, the controller can be configured to monitor a different (or the same) set of engine conditions during vehicle operation.

In some embodiments the controller can be configured to monitor various operating parameters for durations based on different metrics. For example, the driver input analysis and feedback system may be configured to monitor driver inputs for a particular amount of time. In another example the monitoring period may be a particular amount of vehicle trips which may be defined by engine startup and shut down, for example. In still another example the monitoring period may last until data is downloaded from the controller or until a designated amount of memory is full.

Next at 330, the sensor data collected during the monitoring period may be sent to the PCM or controller to be processed and stored in memory. Example data processing may include statistical processing or analysis. For example, data processing may include detecting particular events, conditions and/or anomalies. Furthermore, statistical processing may recognize the frequency at which these events, conditions, and/or anomalies may occur. The data processing further may include various calculations leading to recognition of a particular condition/event in view of one or more other conditions/events. Example condition/event recognition relating to driver input analysis and feedback will be discussed in further detail below with reference to FIGS. 4-6. Note that in some embodiments the sensors may send collected signal data in real-time wirelessly to the controller.

At 340, routine 300 polls for a data download request. If a download request is made, the routine moves to 350 where the processed data is downloaded to an off-board device. Otherwise, if routine 300 does not detect a request for data to be downloaded the routine ends.

Note that the processed data may be downloaded using wired or wireless devices. In one example, a cable may be plugged in to a data port disposed in the vehicle to download processed data. The data may be transferred through the port and associated cable using various technologies and protocols including, universal serial bus (USB), serial connection, or fire wire, for example. In one particular example data may be downloaded via an on-board diagnostics connector (OBD/OBD-II). The OBD/OBD-II standards and protocols may be applied to the data to create a standard data arrangement. As a result of this standardization, a single device may query the on-board computer(s) and download data in most if not all vehicles.

Furthermore, in another example, data may be wirelessly downloaded from the vehicle controller to an off-board device. The data may be wirelessly transferred using various technologies such as laser, infrared, or radio (using protocols/standards such as IEEE 02.11 or Bluetooth®), for example. In some embodiments, wireless data security protocols (e.g. encryption) may be implemented such as wired equivalent privacy (WEP) and Wi-Fi protected access (WPA), among others.

In still another example data may be downloaded to a wired off-board device or storage medium without the use of a cable. For example, data may be downloaded directly to a removable flash memory, storage disk, compact disk, or other portable storage medium.

Furthermore, it should be appreciated that different off-board devices may receive downloaded data. For example a general computing device, such as a laptop, personal computer (PC), personal digital assistant (PDA) may receive data. Additionally, various storage devices may receive downloaded data such as a flash memory or hard drive based storage device, for example.

In some embodiments a request to download data may be automated and further may be triggered by a particular event or condition. For example, a download request may be made automatically after each respective engine shutoff. In another example a download request may be initiated when the vehicle comes in close proximity to a particular wireless device. Further in some embodiments a request to download data may be manual. For example, to download data, a cable may be plugged in to a port in the vehicle and a download routine may be initiated. In one particular example driver input and engine operating condition data may be downloaded during vehicle servicing such as during an oil change, in a similar fashion to checking on-board diagnostics.

Continuing with FIG. 3, at 360 the data further may be processed by the off-board device. For example, off-board processing may include various CPU intensive computing tasks that the on-board controller may not perform. Alternatively (or additionally), off-board processing may include ancillary tasks that if performed by the on-board controller would tax processing resources. Further, off-board data processing may include converting the data to presentable information to a driver.

Next at 370, a summary of fuel economy performance may be generated and displayed to a driver. The summary may include recommendations to improve fuel economy performance that are specific to, and based on, the downloaded data. In one example, the driver performance summary may be displayed on a viewable device, such as a television or computer monitor that may be connected (or not connected) to the off-board device. In another example, the summary may be generated in the form of a print-out on a sheet of paper. In yet another example the driver performance summary may be generated in the form of an email which may be sent to a driver designated email address or performance related website. In yet another example the driver performance summary may be generated in the form of audio instructions presented by an on-board computer. In some embodiments driver recommendations may be generated during automobile maintenance or inspections, such as for example, during engine oil changes or department of environmental quality inspections. Note that example driver training/recommendations will be discussed in further detail below with reference to FIGS. 4-6. After the summary of fuel economy performance is generated and displayed, routine 300 ends. It should be appreciated that routine 300 may be repeated numerous times throughout engine operation.

The above example routine monitors and processes real-time driver inputs and engine conditions under specific states of vehicle operation in order to generate a driver input fuel economy performance summary. By monitoring driver input during specific states of vehicle operation, driver-specific driving habits/performance can be recognized leading to recommendations relating to vehicle operation that may facilitate improved fuel economy performance.

Figure 4:
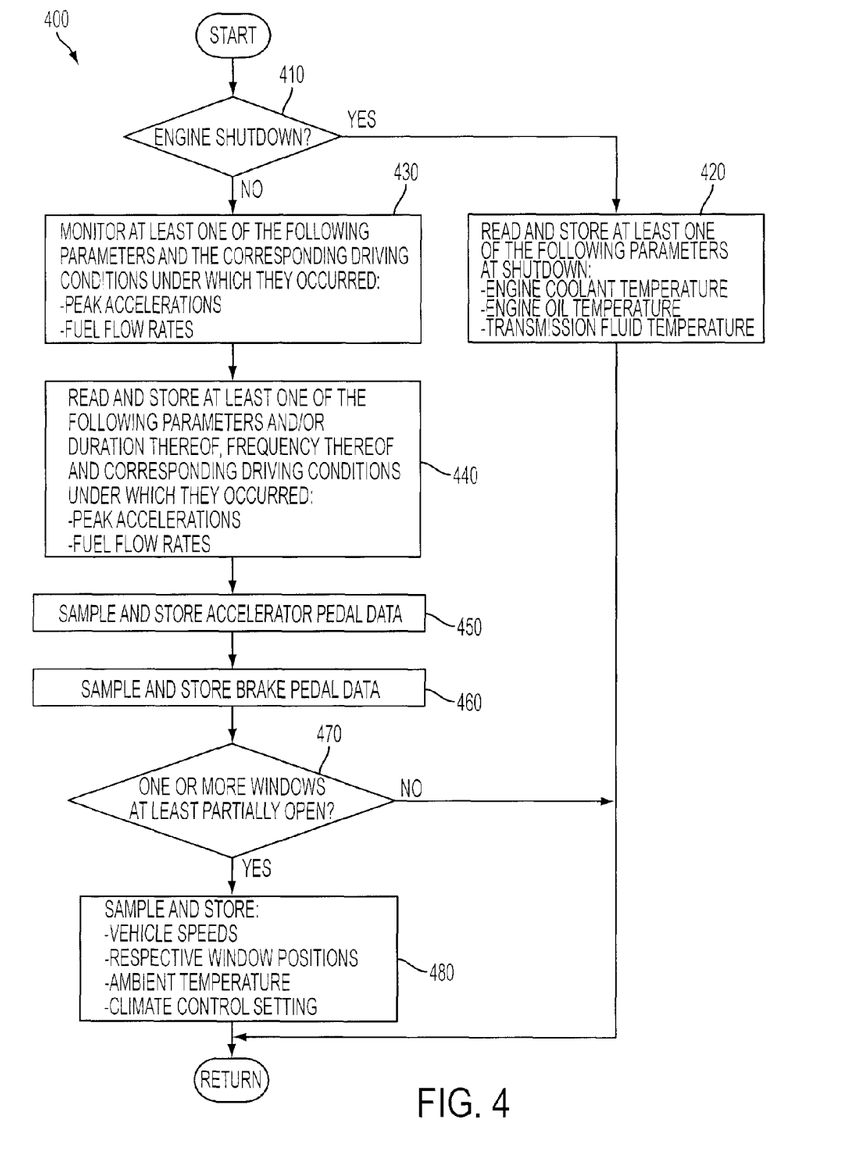
FIG. 4 is a flow diagram of an exemplary driver input and engine condition monitoring routine.

One embodiment advantageously implements a routine to collect data relating to driver vehicle operation for on-board processing in order to provide recommendations to improve fuel economy performance. Specifically, driver input and vehicle condition monitoring routine 400 selects particular engine conditions and driver inputs to monitor during vehicle operation and further selects specific engine conditions to monitor based on an engine shutdown condition.

Now referring to FIG. 4, routine 400 begins at 410 by determining if the vehicle engine is in a shutdown (or shut-off) state. This determination communicates at least one state of vehicle operation to the controller which may cause the controller to select a particular set of engine conditions to be monitored based on that operating state. In other words, if it is determined that the engine is in a shutdown state, routine 400 moves to 420 where at least one of the engine coolant temperature, engine oil temperature, or transmission fluid temperature is read by the respective sensors and stored in controller memory. The measured engine fluid temperatures may be used to determine the engine operating temperature which, in turn, may be considered when generating driver training/recommendations (discussed in further detail below with reference to FIGS. 5 and 6).

Continuing on with FIG. 4, if it is determined that engine shutdown has not occurred, routine 400 moves to 430 where at least one of peak vehicle accelerations and fuel flow rates may be monitored as well as the driving conditions under which they have occurred throughout vehicle operation.

Next, at 440, the monitored peak vehicle accelerations and fuel flow rates may be read and stored in the controller memory. Furthermore, in some embodiments the duration of the respective peak accelerations and/or the duration of particular fuel flow rates may be read and stored in the controller. Additionally (or alternatively), the frequency of peak vehicle accelerations and/or the frequency of one or more particular fuel flow rates may be read and store in memory. In some embodiments, measurements of vehicle accelerations and fuel flow rates above a particular threshold rate may be tallied and stored in the controller to be used for fuel economy performance determinations. The monitored peak vehicle accelerations and fuel flow rates may be used to determine driver acceleration habits which in turn may be considered when generating driver training/recommendations.

Note that various driving conditions may be monitored in addition to peak vehicle accelerations and/or fuel flow rates, which may be used to create a contextual foundation for recognizing driver habits/performance. For example, peak vehicle accelerations and fuel flow rates may be considered in view of vehicle speed. In one particular example, if a vehicle is traveling with a speed that is beyond a threshold speed, then any peak acceleration detected may be determined to be a basis for a recommendation to improve fuel economy performance. Whereas, if a vehicle is traveling below a threshold speed and a peak acceleration is detected, then it may be determined to be appropriate or acceptable (if below a threshold) acceleration with respect to fuel economy performance. As another example, in some embodiments road conditions may be monitored as a basis for determining fuel economy performance. Various road conditions that may be taken into account may include road grade, surface quality (e.g. smooth, or rough), among others. Further, in some embodiments, weather conditions may be monitored as part of determining fuel economy performance. In this way, acceleration monitoring for overly-aggressive driving may be tailored to the experienced conditions, thus enabling more accurate monitoring and more useful recommendations.

Continuing on with FIG. 4, routine 400 samples and stores accelerator pedal excitation data at 450. In particular, the pedal position may be detected via the pedal position sensor and the sensor signal may be sampled and stored in the controller.

Next at 460, routine 400 samples and stores brake pedal excitation data. In particular, the pedal position may be detected via the pedal position sensor and the sensor signal may be sampled and stored in the controller.

Note that in some embodiments the data sampling rates may change according to monitored driving conditions. For example, if a dramatic change in a particular parameter is detected, sampling may be increased or decreased accordingly.

Furthermore, sample data may be used to distinguish particular driving conditions in order to differentiate driving habits that improve fuel economy performance from driving habits that deteriorate fuel economy performance. For example, different ranges of operating parameters may be predetermined to correlate to different driving conditions. In one example, predetermined operating parameter ranges that correlate to particular driving conditions may be stored in a look up table in memory (e.g. ROM) and real-time operating parameter data may be compared to the predetermined operating parameters in order to recognize a particular driving condition. In one particular example, a vehicle traveling in stop and go traffic may travel at low speeds and may have many brake excitations and accelerator pedal excitations, and such a pattern may be recognized by the controller by comparing the real-time data to the collection of predetermined operating parameters. The controller further may determine that the pedal excitations are appropriate based on the vehicle speed and the sample history. In some driving conditions, the controller may use the operating parameters to recognize pedal tip-ins and tip-outs which may be determined to be detrimental to fuel economy performance.

Next at 470, routine 400 may determine if one or more windows is at least partially open. If it is determined that no windows are at least partially open then routine 400 ends. Otherwise, routine 400 moves to 480. The position of the windows may affect aerodynamics of the vehicle when traveling beyond a threshold speed. Specifically, the open windows of the vehicle may enlarge the drag coefficient of the vehicle causing an increase in engine load to maintain vehicle speed. The increased engine load in turn may cause a decrease in fuel economy performance greater than the fuel required to power an air-conditioning system, for example.

Next at 480, routine 400 may sample and store one or more of vehicle speed, respective window positions, internal and external ambient temperatures, and climate control settings. The ambient temperatures may be used to make recommendations for adjusting the climate control settings and window positions to increase fuel economy performance based on vehicle conditions (e.g., speed) and environmental conditions (e.g., ambient temperature and humidity). After the environmental condition operating parameters are sampled and stored, routine 400 ends. It should be appreciated that routine 400 may be repeated numerous times throughout engine operation.

Figure 5:
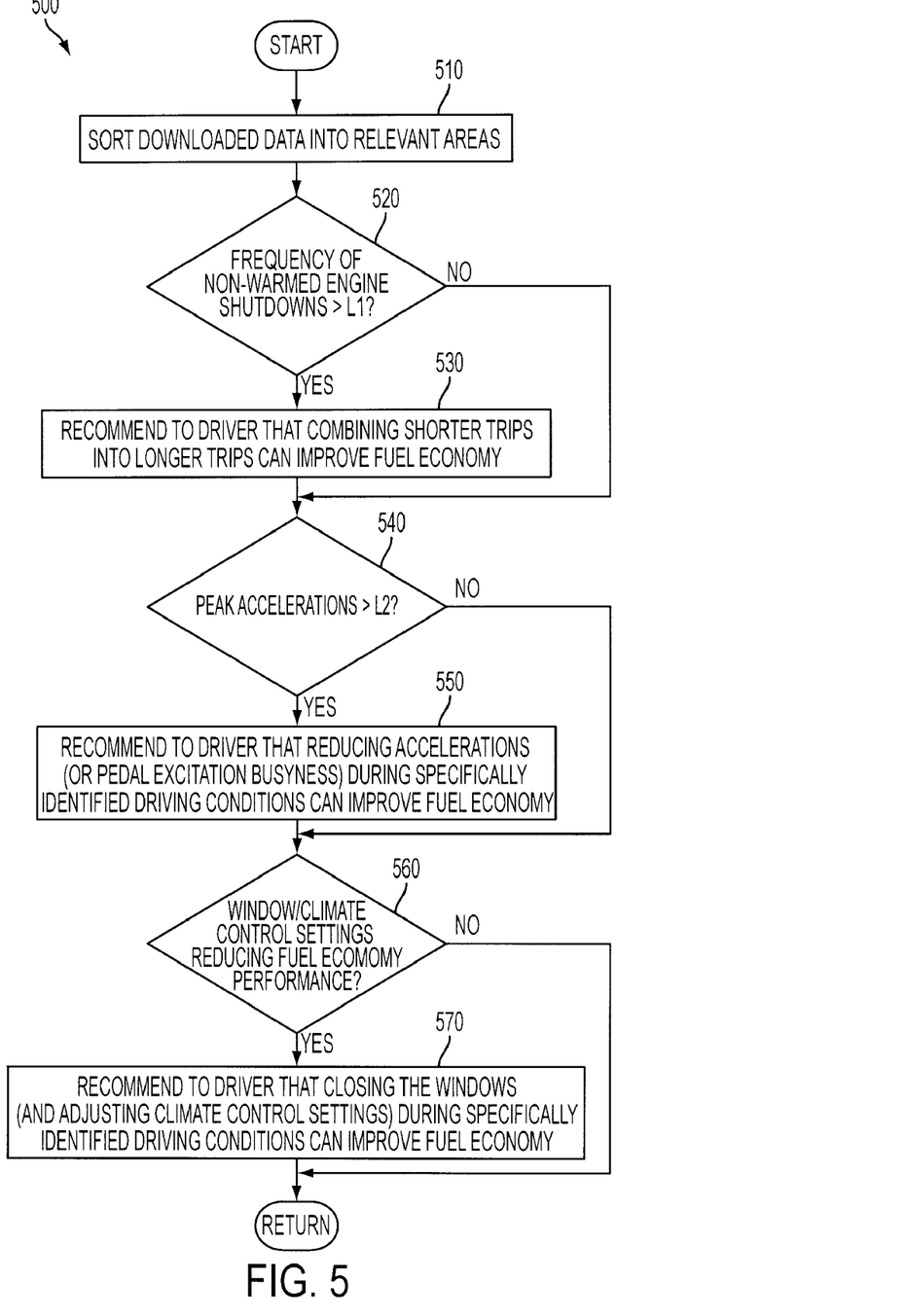
FIGS. 5-6 are flow diagrams of exemplary analysis and feedback routines for improved fuel economy performance.
Figure 6:
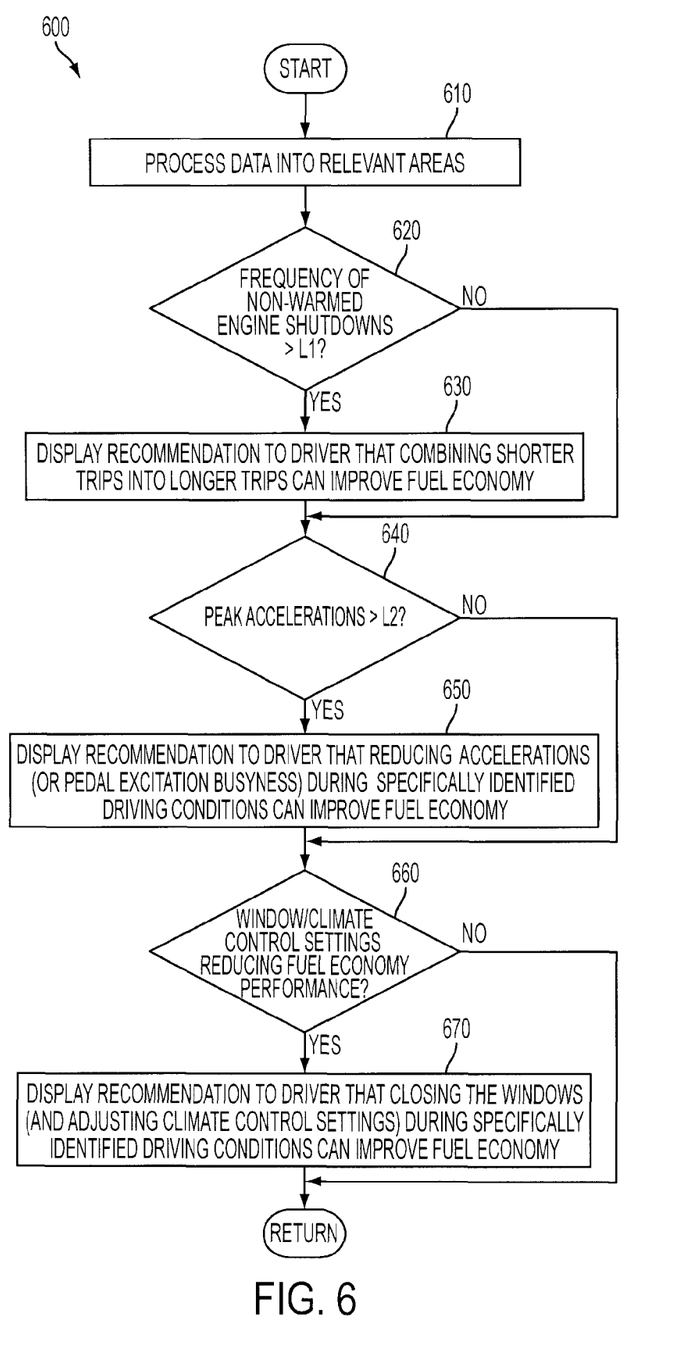

The data collected in the driver input and engine condition monitoring routine as shown in FIG. 4 may be used by the driver input analysis and feedback system to provide driver training/recommendations as demonstrated in exemplary flow diagrams shown in FIGS. 5 and 6.

FIG. 5 shows an exemplary driver input analysis and feedback flow diagram that may be implemented in systems that download data to off-board devices in order to provide driver training/recommendations to improve fuel economy performance. Specifically, routine 500 recognizes driving conditions which potentially may result in diminished fuel economy performance and analyzes driver input data based on driving conditions and generates recommendations to improve fuel economy performance.

Routine 500 begins at 510 by sorting downloaded data into relevant areas. In other words, data processing may be performed that may group measured engine parameters based on determined driving conditions.

Next at 520, routine 500 determines if the frequency of non-warmed engine shutdowns is beyond a threshold limit (L1). The determination of a non-warmed engine shutdown may be made based on one or more of the engine related temperatures and the ambient temperature measured in routine 400. In some embodiments the threshold limit L1 may be a predetermined number, while in some embodiments the threshold may be calibratible based on for example, engine age or settings based on driver preference. If routine 500 determines that the frequency of non-warmed engine shutdowns is greater than a threshold limit then routine 500 moves to 530. Otherwise, if routine 500 determines that the frequency of non-warmed engine shutdowns is less than a threshold limit then routine 500 moves to 540.

At 530, routine 500 recommends to the driver that combining shorter trips into longer trips can improve fuel economy. Specifically, more fuel may be consumed during engine start if an engine that is not warm. Therefore, by combining shorter trips into longer trips, repeated operation of the vehicle without fully warming up the engine may be avoided, thus improving fuel economy.

In some embodiments the recommendation may include statistics generated during processing. In one example the statistics may be represented graphically. In particular, an idealized fuel economy performance may be graphed against actual fuel economy performance for the benefit of the driver. Further, feedback may include a predicted fuel economy improvement that can be expected if the recommendation is followed.

Next at 540, routine 500 determines if the frequency of detected peak accelerations is beyond a threshold limit (L2). In one example, peak accelerations may be detected/determined based on pedal position and/or engine speed. In some embodiments the threshold limit L2 may be a predetermined number, while in some embodiments the threshold may be calibratible based on engine age or settings based on driver preference. For example, the threshold limit L2 may be set to a higher number if the vehicle is operating in a sport mode. On the other hand, the threshold limit L2 may be set to a lower number if the vehicle is operating in a fuel economy mode. If routine 500 determines that the frequency of peak accelerations is greater than a threshold limit then routine 500 moves to 550. Otherwise, if routine 500 determines that the frequency of peak accelerations is less than a threshold limit then routine 500 moves to 560.

At 550, routine 500 recommends to the driver that reducing accelerations during specifically identified driving conditions can improve fuel economy. Optionally (or additionally), a recommendation to reduce pedal excitation busyness may be made additionally or optionally. Peak accelerations and inconsistent use of the accelerator/brake pedal may consume additional fuel. As such the routine may recommend for example, that fuel economy performance may be improved by accelerating gradually, maintaining speed, and watching traffic conditions ahead to anticipate accelerator and/or brake usage. Furthermore, the routine may recommend avoiding peak accelerations at high speeds, peak accelerations at startup, or driving habits such as repeated peak acceleration and heavy breaking. Further still, the routine may recommend watching traffic ahead to reduce use of throttle depression when braking is likely to be required imminently. In one example, a print-out may be generated which may include a list of driving events or conditions experienced in recent driving in which peak accelerations may be detrimental to fuel economy performance. Furthermore, in some embodiments the recommendations may include a driving history showing driver acceleration habits under identified driving conditions, as well as specific combinations of parameters at which over-acceleration was identified and which had a greatest effect on fuel economy. Again, expected performance improvements may be indicated if such recommendations are followed in the future.

Next at 560, routine 500 determines if the window settings and climate control setting are reducing fuel economy performance. In one example, this assessment may be based on the vehicle speed and window positions. Furthermore, routine 500 determines if the climate control settings are set to a temperature that may be suitable for driver comfort if the windows are closed based on ambient temperature and humidity inside and outside of the vehicle. If routine 500 determines that the window and climate control settings are reducing fuel economy performance then routine 500 moves to 560. Otherwise, if routine 500 determines that the window and climate control settings are not reducing fuel economy performance then routine 500 ends.

At 570, routine 500 recommends to the driver that closing the windows (and optionally adjusting the climate control settings) can improve fuel efficiency performance. As discussed above, window position may be considered in view of vehicle speed. If one or more windows are at least partially open and the vehicle is traveling above a predetermined threshold speed then the drag created by the open window(s) may negatively affect fuel economy performance. Additionally, if the vehicle is traveling below a threshold speed, the windows may be opened without negatively affecting drag of the vehicle and the climate control settings may be adjusted (e.g. turning off the air conditioning) so that less fuel is consumed running the air conditioning compressor and fuel economy may be improved.

In one example, the driver recommendation may show how the open window(s) may affect fuel performance. Specifically, the window position (percent open) may be compared to vehicle speed (e.g. graphically) to show fuel economy performance drop-off as speed increases beyond a threshold speed. After the recommendation to adjust the window position and/or climate control is made, routine 500 ends. It should be appreciated that routine 500 may be repeated numerous times throughout engine operation.

Note that some parameters may be used in intermediate operations, in addition to, or optionally to those discussed in the above routine. Further, it should be appreciated that the driver training/recommendations may be presented in different formats and/or graphical layouts without departing from the scope of the present disclosure. For example, driver training/recommendations may be presented via software on an off-board device. In some embodiments, driver training software may include driver simulations which compare actual driving history to ideal driving performance with regard to fuel efficiency.

FIG. 6 shows an exemplary driver input analysis and feedback flow diagram that may be implemented in systems with on-board processing. Furthermore, the driver input analysis and feedback system of FIG. 6 may be configured to provide driver training/recommendations in the vehicle to the driver to improve fuel economy performance similar to the routine discussed in FIG. 5. Specifically, routine 600 recognizes driving conditions which potentially may result in diminished fuel economy performance and analyzes driver input data based on the driving conditions and generates recommendations via an on-board display to improve fuel economy performance. In some embodiments the driver training/recommendations may be provided in real-time based on system feedback.

Routine 600 begins at 610 by processing data into relevant areas. In other words, data processing may be performed that may group measured engine parameters based on determined driving conditions.

Next at 620, routine 600 determines if the frequency of non-warmed engine shutdowns is beyond a threshold limit (L1). The determination of a non-warmed engine shutdown may be made based on one or more of the engine related temperatures and the ambient temperature measured in routine 400. In some embodiments the threshold limit L1 may be a predetermined number, while in some embodiments the threshold may be calibratible based on engine age or settings based on driver preference. If routine 600 determines that the frequency of non-warmed engine shutdowns is greater than a threshold limit then routine 600 moves to 630. Otherwise, if routine 600 determines that the frequency of non-warmed engine shutdowns is less than a threshold limit then routine 600 moves to 640.

At 630, routine 600 displays a recommendation to the driver that combining shorter tips into longer trips can improve fuel economy. In one example, the recommendation may be displayed on a video screen embedded in the instrument panel cluster. In some embodiments the recommendation may include statistics generated during processing. In one example the statistics may be represented graphically. In particular, the ideal fuel economy performance may be graphed against actual fuel economy performance for the benefit of the driver.

Next at 640, routine 600 determines if the frequency of detected peak accelerations is beyond a threshold limit (L2). In one example, peak accelerations may be detected/determined based on pedal position and/or engine speed. In some embodiments the threshold limit L2 may be a predetermined number, while in some embodiments the threshold may be calibratible based on engine age or settings based on driver preference. For example, the threshold limit L2 may be set to a higher number if the vehicle is operating in a sport mode. On the other hand, the threshold limit L2 may be set to a lower number if the vehicle is operating in a fuel economy mode. If routine 600 determines that the frequency of peak accelerations is greater than a threshold limit then routine 600 moves to 650. Otherwise, if routine 600 determines that the frequency of peak accelerations is less than a threshold limit then routine 600 moves to 660.

At 650, routine 600 displays a recommendation to the driver that reducing accelerations during specifically identified driving conditions can improve fuel economy. Optionally (or additionally), a recommendation to reduce pedal excitation busyness may be displayed.

Next at 660, routine 600 determines if the window settings and climate control setting are reducing fuel efficiency performance. In one example, this assessment may be based on the vehicle speed and window positions. Furthermore, routine 600 determines if the climate control settings are set to a temperature that may be suitable for driver comfort if the windows are closed based on ambient temperature inside and outside of the vehicle. If routine 600 determines that the window and climate control settings are reducing fuel economy performance then routine 600 moves to 660. Otherwise, if routine 600 determines that the window and climate control settings are not reducing fuel economy performance then routine 600 ends.

At 670, routine 600 displays a recommendation to the driver that closing the windows (and optionally adjusting the climate control settings) can improve fuel efficiency performance. After the recommendation to adjust the window position and/or climate control is displayed routine 600 ends. It should be appreciated that routine 600 may be repeated numerous times throughout engine operation. Note that some parameters may be used in intermediate operations, in addition to, or optionally to those discussed in the above routine.

Optionally, in some embodiments driving recommendations may be provided via audio recording. For example, when a condition that affects fuel economy is detected by the driver input analysis and feedback system, an audio recording may be played of a voice recommending a change in driver input to improve fuel economy performance, where the recommendation may be specific to the conditions detected. In some embodiments audio and visual indicators may be implemented in a driver training system. For example, the system may produce an audio signal (e.g. a bell or horn) to alert a driver to a newly detected/displayed driving recommendation.

Furthermore, in some embodiments the driver input analysis and feedback system may include an on-board user interface. The user interface may be configured to enable the driver to adjust analysis and feedback settings based on the driver's desired preference. For example, the user interface may include selectable driving modes which vary in fuel economy performance tolerances. In one example, a sport mode may have minimal fuel economy performance monitoring tolerances, while an economy mode may have fuel economy performance monitoring tolerances that are more stringent than the sport mode. In some embodiments the user interface may include driving conditions/events that may be selectively monitored for fuel economy performance. For example, a driver may select or deselect peak accelerations to be monitored for fuel economy performance. As another example, driver input may be selectively monitored during different driving conditions. For example, driver input may be selectively monitored during different traffic conditions, such as freeway driving, stop and go traffic, city driving, etc. Moreover, in some embodiments the driver input analysis and feedback system may be selectively disabled as desired by a driver.

In some embodiments driver recommendations may be personalized for each respective driver. For example, different drivers operating the same vehicle may have driving profiles which may be accessed prior to vehicle operation. During vehicle operation each respective driver may have their driving habits monitored and attributed to their profile and personalized recommendations may be generated based on their driving history. In this way, a plurality of drivers may be monitored and personalized training/recommendations may be provided to each respective driver to improve fuel economy performance.

With increasing gas prices becoming more of a concern for vehicle shoppers, the driver input analysis and feedback system may be advantageously marketed in automobile sales. The driver input analysis and feedback system may be a potential selling point in the sale of a vehicle since fuel economy performance may be improved due to the driver training/recommendations. In particular, marketing may be directed to consumers interested in identifying and correcting driving habits that decrease fuel efficiency performance as well as learning new driving habits that may improve fuel economy performance.

Figure 7:
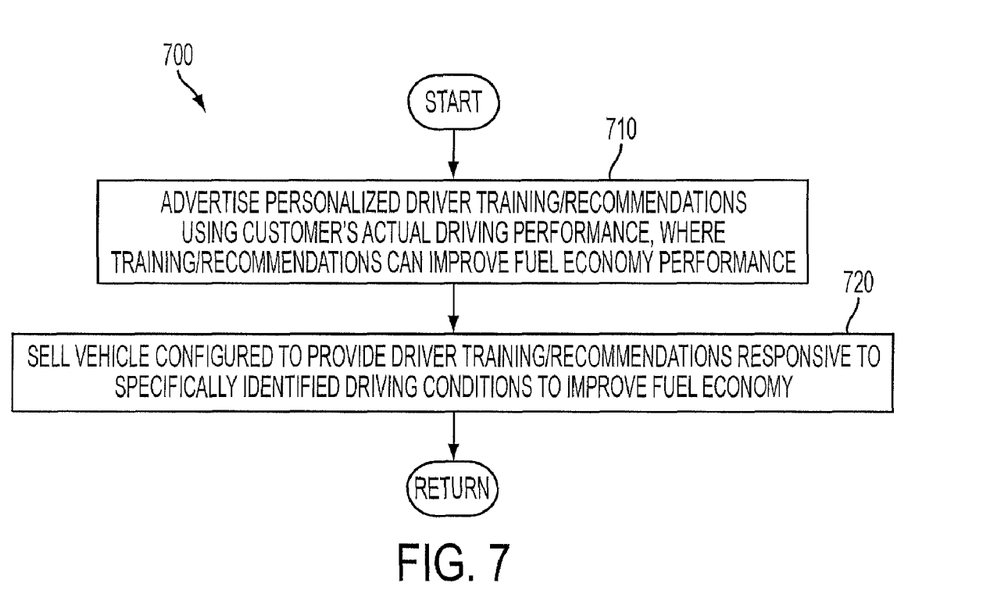
FIG. 7 is a flow diagram of an exemplary routine for marketing a driver input analysis and feedback system.

FIG. 7 shows an exemplary embodiment of an advertising and sales routine for the driver input analysis and feedback system. Routine 700 beings at 710 by advertising personalized driver training/recommendations using customer's actual driving performance, where the training/recommendations can improve fuel economy performance. In one example advertising may be directed to an on-board vehicle system with a user interface that displays/plays recommendations to each respective driver. In another example advertising may be directed to training/recommendations generated from a driving history that may be reviewed occasionally as part of a vehicle maintenance or service plan. Further, in some embodiments driver training/recommendations may be marketed as a universal fuel economy performance enhancement that may improve the fuel economy performance of an entire line or brand of vehicles.

Next at 720, a vehicle configured to provide driver training/recommendations responsive to specifically identified driving conditions in order to improve fuel economy performance as advertised in the marketing strategy may be sold to a vehicle consumer. The advertising in 710 advantageously provides directed marketing of the vehicle's ability to generate driver training/recommendations to improve fuel economy performance, making the vehicle more desirable to the consumer such that the vehicle may be sold with less effort.

It should be appreciated that in some embodiments, the driver input analysis and feedback system may be marketed as an aftermarket component which may be installed in vehicles to facilitate improved fuel economy performance.

Furthermore, in some embodiments the driver training/recommendations may include recommendations that are generated based on vehicle specific information, such that recommendations may differ between two systems implemented in different vehicles. An exemplary driver input analysis and feedback system that generates vehicle specific driver training/recommendations may recognize a particular vehicle configuration and take full advantage of that configuration when generating recommendations in order to maximize the improvement of fuel economy performance of the vehicle.

It will be appreciated that the configurations and routines disclosed herein are exemplary in nature, and that these specific embodiments are not to be considered in a limiting sense, because numerous variations are possible. The subject matter of the present disclosure includes all novel and nonobvious combinations and subcombinations of the various systems and configurations, and other features, functions, and/or properties disclosed herein.

The following claims particularly point out certain combinations and subcombinations regarded as novel and nonobvious. These claims may refer to "an" element or "a first" element or the equivalent thereof. Such claims should be understood to include incorporation of one or more such elements, neither requiring nor excluding two or more such elements. Other combinations and subcombinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method of driver training to improve fuel economy performance of a vehicle, the method comprising:
   receiving selected vehicle operating temperature and humidity data indicative of driving conditions;
   processing said received selected vehicle operating temperature and humidity data; and generating driving recommendations to improve fuel economy performance based on said processed received selected vehicle operating temperature and humidity data.

2. The method of claim 1 wherein the driving recommendations include information customized to a particular driver based on a driver profile.

3. The method of claim 2 further comprising generating a driver history corresponding to the driver profile, the driver history providing updated fuel economy performance information.

4. The method of claim 1 wherein the received selected vehicle operating temperature and humidity data is captured in response to a driver request to monitor performance.

5. The method of claim 4 wherein the driver request includes selected driving conditions in which the received selected vehicle operating temperature and humidity data is captured.

6. The method of claim 1 wherein the driving recommendations include rolling up windows when the vehicle travels beyond a predetermined speed.

7. The method of claim 1 further comprising recommending reducing pedal excitation business in response to pedal excitation.

8. The method of claim 1 further comprising recommending combining shorter vehicle trips into longer vehicle trips when an engine fails to reach a warmed-up condition.

9. The method of claim 1 wherein the processing is performed by a computing device off-board of the vehicle.

10. A method for a driver input analysis system to provide feedback to a vehicle operator to improve fuel economy performance, comprising:
storing selected vehicle acceleration data;
generating driving recommendations to improve fuel economy performance based on said selected vehicle acceleration data while a speed of a vehicle is greater than a threshold; and
presenting the driving recommendations in the vehicle to the vehicle operator.

11. The method of claim 10 wherein presenting includes displaying the driving recommendations on a display screen.

12. The method of claim 10 wherein presenting includes an audio indication of the driving recommendations.

13. The method of claim 10 wherein the driving recommendations further include driving recommendations in response to selected data including at least one of engine coolant temperature, engine oil temperature, and transmission fluid temperature.

14. The method of claim 10 wherein the selected vehicle acceleration data includes at least one of peak accelerations and fuel flow rates.

15. The method of claim 10 wherein the selected vehicle acceleration data includes pedal excitation data.

16. The method of claim 10 wherein a sampling rate of said selected vehicle acceleration data is adjusted based on vehicle operating conditions.

17. A method of driver training to improve fuel economy performance of a vehicle, the method comprising:
monitoring selected vehicle operating conditions during engine operation and after engine shutdown; and
generating recommendations to train a driver to improve fuel economy performance based on the monitored selected vehicle operating conditions via a driver input analysis and feedback system.

18. The method of claim 17 wherein the recommendations are provided by way of an on-board diagnostic connector.

19. The method of claim 17 further comprising: providing a maintenance plan for the vehicle that includes providing updated driver training performance history.

20. The method of claim 17 wherein the vehicle is configured to display said driver training on a display screen.

* * * * *